US011020816B1

(12) United States Patent
Coffey et al.

(10) Patent No.: US 11,020,816 B1
(45) Date of Patent: Jun. 1, 2021

(54) METHODS OF FORMING A FRICTION STIR WELD BETWEEN A STEEL PIECE AND AN ALUMINUM PIECE, AND RELATED ASSEMBLIES

(71) Applicant: Seagate Technology LLC, Cupertino, CA (US)

(72) Inventors: Jerome Thomas Coffey, Boulder, CO (US); Samuel Edward Severson, Longmont, CO (US); Sok Li Goh, Choa Chu Kang Crescent (SG); S. Selvaruben, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 122 days.

(21) Appl. No.: 16/121,872

(22) Filed: Sep. 5, 2018

(51) Int. Cl.
| | | |
|---|---|---|
| *B23K 20/12* | (2006.01) | |
| *G11B 33/02* | (2006.01) | |
| *G11B 33/14* | (2006.01) | |
| *B23K 103/04* | (2006.01) | |
| *B23K 103/10* | (2006.01) | |
| *B23K 103/20* | (2006.01) | |

(52) U.S. Cl.
CPC ........ *B23K 20/1255* (2013.01); *B23K 20/127* (2013.01); *G11B 33/022* (2013.01); *G11B 33/1486* (2013.01); *B23K 20/125* (2013.01); *B23K 2103/04* (2018.08); *B23K 2103/10* (2018.08); *B23K 2103/20* (2018.08)

(58) Field of Classification Search
CPC .............................................. B23K 20/122–128
USPC ................................................ 228/112.1, 2.1
See application file for complete search history.

(56) References Cited

U.S. PATENT DOCUMENTS

| | | | | |
|---|---|---|---|---|
| 5,880,904 | A | * | 3/1999 | Mizoshita ............... H02K 7/086 360/97.16 |
| 7,119,984 | B2 | * | 10/2006 | Macleod ................. B23K 26/12 360/99.18 |
| 8,016,179 | B2 | | 9/2011 | Burford |
| 8,279,552 | B2 | | 10/2012 | Stipe |
| 8,605,413 | B2 | * | 12/2013 | Wang ...................... B23P 15/00 361/679.01 |
| 8,797,679 | B1 | * | 8/2014 | Rosner ................. G11B 25/043 360/99.2 |
| 9,001,458 | B1 | * | 4/2015 | Vitikkate ............. H05K 5/0095 360/97.22 |
| 9,019,646 | B2 | | 4/2015 | Rausch et al. |
| 9,058,851 | B1 | * | 6/2015 | Hanke ................. G11B 33/1486 |
| 9,522,446 | B2 | * | 12/2016 | Law ........................ B21K 23/00 |
| 9,536,572 | B2 | * | 1/2017 | Lapp ......................... H02K 5/12 |
| 9,697,859 | B1 | * | 7/2017 | Tripathy .............. G11B 5/8404 |

(Continued)

FOREIGN PATENT DOCUMENTS

| | | | | | |
|---|---|---|---|---|---|
| JP | | 2000167676 | A | * 6/2000 | ........... B23K 20/122 |
| WO | WO-02070187 | A1 | * 9/2002 | ......... B23K 20/1235 |

OTHER PUBLICATIONS

Wang et al. "Micro friction stir welding of multilayer aluminum alloy sheets" (May 29, 2018).*

(Continued)

*Primary Examiner* — Kiley S Stoner
(74) *Attorney, Agent, or Firm* — Kagan Binder, PLLC (57) ABSTRACT

Described are methods for forming a friction stir weld between a steel piece and an aluminum piece, with specific examples of the steel piece and the aluminum piece being a cover and a base of an enclosure.

21 Claims, 5 Drawing Sheets

(56) References Cited

U.S. PATENT DOCUMENTS

| | | | |
|---|---|---|---|
| 9,754,618 B1* | 9/2017 | Srinivasan | G11B 5/66 |
| 10,153,005 B1* | 12/2018 | Ayanoor-Vitikkate | G11B 33/148 |
| 10,399,177 B1* | 9/2019 | Coffey | H05K 5/03 |
| 10,438,614 B1* | 10/2019 | Wang | B23K 26/0823 |
| 10,442,030 B2* | 10/2019 | Severson | B23K 20/129 |
| 10,569,356 B1* | 2/2020 | Coffey | B23K 26/361 |
| 10,596,658 B1* | 3/2020 | Coffey | B23K 20/1255 |
| 2005/0051602 A1* | 3/2005 | Babb | B23K 20/123 228/112.1 |
| 2005/0068666 A1* | 3/2005 | Albrecht | G11B 33/1466 360/99.18 |
| 2005/0120535 A1* | 6/2005 | Gendou | B23K 20/123 29/428 |
| 2005/0156010 A1* | 7/2005 | Flak | B23K 20/1255 228/112.1 |
| 2006/0138197 A1* | 6/2006 | Aota | B23K 20/1255 228/112.1 |
| 2007/0064403 A1* | 3/2007 | Badarinarayan | B23K 20/1265 361/796 |
| 2007/0181646 A1* | 8/2007 | Aota | B23K 20/1255 228/101 |
| 2008/0158730 A1* | 7/2008 | Furukawa | G11B 5/1272 360/110 |
| 2008/0247082 A1* | 10/2008 | Kavosh | G11B 33/1446 360/99.21 |
| 2010/0078224 A1* | 4/2010 | Steel | B23K 20/1225 175/369 |
| 2010/0089977 A1* | 4/2010 | Chen | B23K 20/122 228/114.5 |
| 2011/0097595 A1* | 4/2011 | Takeda | B23K 35/004 428/594 |
| 2011/0104515 A1* | 5/2011 | Kou | B23K 20/1265 428/649 |
| 2011/0180587 A1* | 7/2011 | Trapp | B23K 20/1265 228/2.1 |
| 2012/0052322 A1* | 3/2012 | Hatakeyama | B23K 20/1265 428/650 |
| 2012/0275287 A1* | 11/2012 | McGuire, Jr. | G11B 25/043 369/75.11 |
| 2013/0088795 A1* | 4/2013 | Brown | G11B 33/146 360/97.14 |
| 2014/0360650 A1* | 12/2014 | Silvanus | B23K 20/1255 156/73.5 |
| 2015/0294691 A1* | 10/2015 | Inaba | G11B 5/84 360/97.22 |
| 2017/0062019 A1* | 3/2017 | Severson | G11B 33/1486 |
| 2018/0050419 A1* | 2/2018 | Das | B23K 20/1265 |
| 2018/0073532 A1* | 3/2018 | Whalen | F16B 5/08 |
| 2019/0076956 A1* | 3/2019 | Coffey | G06F 1/1656 |
| 2019/0076957 A1* | 3/2019 | Severson | B23K 20/129 |
| 2020/0016687 A1* | 1/2020 | Whalen | B32B 15/012 |

OTHER PUBLICATIONS

Sithole et al. "Recent developments in Micro Friction Stir Welding: A review" (Sep. 21, 2016).*

* cited by examiner

METHODS OF FORMING A FRICTION STIR WELD BETWEEN A STEEL PIECE AND AN ALUMINUM PIECE, AND RELATED ASSEMBLIES

FIELD

The invention relates to methods for forming a friction stir weld between a steel piece and an aluminum piece; particular embodiments of the invention relate to: methods of forming a friction stir weld between a steel cover and an aluminum base of an electronic device; to electronic devices that include a steel cover, an aluminum base, and a friction stir weld between the steel cover and the aluminum base; to precursors of these devices such as assemblies in the form of electronic device enclosures that include an aluminum base and a steel cover that in an assembled condition form a joint at which a friction stir weld can be produced.

BACKGROUND

Electronic devices such as data storage devices (e.g., hard disk drives or "HDDs"), solid state memories, microelectronic devices, and computers (e.g., personal computers, cell phones, tablets, laptops, etc.) perform functions that are essential in today's digital information-intensive world. As our reliance on these devices increases, so do the performance requirements of these devices, including their combined data-processing capabilities, speed, and reliability.

For hard disk drives in particular, these devices must perform at ever-increasing levels of data storage capacity, with very high and increasing levels of speed and reliability. To increase the data storage capacity of a hard disk drive device, ongoing goals include: to package more data onto each of multiple hard magnetic disks contained in a hard disk drive device (i.e., to increase "areal density" of the hard magnetic disks, which is a measure of the quantity of information bits that can be stored on a given area of disk surface); to include more disks as part of a hard disk drive device of a given size by increasing the interior space of the device; or to reduce the size of a device that contains a given number of hard magnetic recording disks.

One way to improve performance and storage density of a hard disk drive is to build the hard disk drive with an enclosure that is sealed hermetically to contain a low-density atmosphere, for example an atmosphere of concentrated helium. Benefits of operating a hard disk drive in a low density atmosphere include that the low density atmosphere can reduce the amount of drag force that affects a spinning disk or a stack of closely-spaced spinning disks. The reduced amount of drag can significantly reduce the amount of power required to cause a disk stack to spin. Also, a low density atmosphere can reduce the amount of unwanted, non-rotational movement or "flutter" that occurs in a spinning disk, or undesired movement of a suspension assembly that works in conjunction with the spinning disk. Reducing un-wanted motion of a disk or suspension assembly can allow adjacent disks of a disk stack to be placed more closely together, which allows for increased areal density by enabling a narrower data track pitch. Also advantageously, efficient thermal conduction of helium can allow for a reduced operating temperature of a device, and lower density gases (relative to air) can additionally produce less acoustic noise. The reliability of a hard disk drive that contains an atmosphere of concentrated helium in a hermetically sealed enclosure can also be increased due to a reduced level of humidity at the drive interior, due to elimination of other gases and contaminants such as reactive (e.g., corrosive) gases, and due to a reduced sensitivity of the atmosphere to altitude and external pressure variations.

Other types of disk drives do not include a low density (e.g., concentrated helium) internal atmosphere. These other disk drives include an air atmosphere; they do not require a hermetic seal, but do require a seal that is highly water and moisture resistant.

For either type of disk drive, those that are hermetically sealed with a low density atmosphere, and those that contain an air atmosphere with a moisture-resistant seal, an ongoing goal is to maximize the internal space of the disk drive. One approach for increasing the internal space of a disk drive is to reduce the size of the components of the enclosure, such as the base or cover.

SUMMARY

For commercial scale production, an electronic device must be capable of being assembled in a manner that is effective, efficient, and reliable. For commercially producing electronic devices, one method that is presently being developed by the Applicant is friction stir welding.

Friction stir welding is a metal forging technique that is known to be useful in certain, relatively specific welding applications. See for example U.S. Pat. Nos. 8,016,179 and 9,536,572, the entireties of these documents being incorporated herein by reference. Friction stir welding techniques, however, are known to have limits, and are understood to be not necessarily effective or efficient for all situations where a weld between two metal pieces is required. Friction stir welding techniques may not be effective for forming a weld between two pieces of different sizes (thicknesses), or for forming a weld between two pieces of different types of metal. Friction stir welding may be most effectively and reliably used for welding together two metal pieces that are of the same type of metal and that each do not have too small of a thickness, such as for forming a weld between two metal pieces of the same type of metal that each have not too small of a thickness and that each have a thickness that is somewhat similar to the other.

Friction stir welding techniques are not generally known to be reliably or successfully used for welding together two metal pieces that are relatively thin, or to weld together a first metal piece having a relatively small thickness with a second metal piece having a relatively larger thickness. When the two metal pieces are of different metal materials, e.g., one of steel and one of aluminum, the task becomes still more difficult.

The Applicant has been studying and developing friction stir welding techniques for use in welding together the outer pieces of hard disk drives. In that application, the hard disk drive includes an enclosure having an outer cover and a base. Each of the outer cover and the base is made of aluminum or an aluminum alloy. The base has a substantially greater thickness compared to the cover, but the Applicant has developed friction stir welding methods and method parameters that have been identified as useful for forming a friction stir weld from these differently-sized aluminum pieces, to hold the pieces together and form a hermetic seal. Applicant's research, for example, has led to designs of useful and advantageous friction stir weld tools, useful and advantageous welding conditions and parameters (e.g., tool rotation speed, translational speed of the tool during friction stir weld formation, pressure of the tool against the workpiece), and useful and advantageous cover and base configurations, for welding a relatively thin aluminum cover to a thicker aluminum base.

The presently-described invention relates generally to methods of forging a weld between two metal pieces by friction stir welding, with one of the two pieces being a piece of steel and the other piece being a piece of aluminum. The friction stir welding techniques of the invention can be applied to any two such metal pieces of steel and aluminum, for use with any type of product precursors, or any type of friction stir welded product. In certain uses of the inventive methods, which are exemplary and not limiting, the invention relates to: methods of friction stir welding a steel cover of an electronic device to an aluminum base of the device; to electronic devices that include a friction stir weld between a steel cover and an aluminum base; to precursors of these devices such as assemblies in the form of electronic device enclosures that include an aluminum base and a steel cover that in an assembled condition form a joint at which a friction stir weld can be produced.

Thus, the friction stir welding methods of the present description involve forming a friction stir weld between an aluminum piece and a steel piece. In particular embodiments the steel piece can have a relatively small thickness and the aluminum piece can have a thickness that is substantially greater than the thickness of the steel piece.

Presently useful examples of friction stir welded aluminum and steel pieces are a steel cover welded to an aluminum base of an electronic device, especially a hard disk drive. Friction stir welding a thin steel cover to an aluminum disk drive base has potential advantages relative to welding a thin aluminum cover to an aluminum base. One potential advantage is that the steel cover can have a reduced thickness relative to the aluminum cover, with the same strength; alternately, the steel cover can have a similar thickness with greater strength. Steel can be roughly 2.8 times the stiffness of aluminum for a given thickness. In theory, a 0.4 mm (15.7 mils) thick aluminum cover (commonly used in commercial hard disk drives) may be replaced by a steel cover having a reduced thickness, e.g., a thickness of 0.14 mm (about 6 mils), and still retain an equivalent stiffness.

A steel cover with a reduced thickness can allow for additional space for working components of the hard disk drive. A total thickness of a hard disk drive assembly is constrained by general product size requirements and "form factor standards." Within a desired total thickness of an acceptable hard disk drive enclosure, allocation of thicknesses of various components, and of spaces between those components, is very important. The total thickness of the enclosure must be considered in terms of: space needed for magnetic disks and for spaces between the disks, disk thickness, thickness of the base bottom, thickness of a process cover (used for helium-filled hard disk drives), and thickness of the final (outer) cover. A small reduction in thickness of a steel cover relative to an aluminum cover can make space available for other drive components, e.g. a thicker base.

A thickness advantage can be important for any of a variety of hard disk drive types. Some hard disk drives are filled with helium. These disk drives presently include an aluminum base, an interior "process" cover, and an outer (or "final") cover that is typically made of aluminum. Replacing the aluminum outer cover with a thinner steel outer cover that can be friction stir welded to the base can achieve advantages from the thinner steel cover, while also providing a hermetic seal at the friction stir weld.

Other currently-commercial hard disk drive products are not helium-filled. These drives are contained in an enclosure that includes a single outer cover attached to the base, and do not include a process cover. The outer cover, made of steel, functions as the only (and "final" or "outer") cover to enclose the internal components of the hard disk drive. The outer steel cover does not need to be attached with a hermetic seal, but should create a water-resistant and moisture-resistant seal of the interior of the hard disk drive. Typically, the outer steel cover is attached to the base using screws and a gasket that seals the interior and prevents the passage of air and moisture into the interior. Recently, humidity control has become more important in some of these hard disk drive products, for example hard disk drives that work using principles of heat assisted magnetic recording (HAMR). Friction stir welding the currently-used steel cover directly to the aluminum base of these products would be one method of providing an improved watertight and humidity-tight seal.

In one aspect the invention relates to an enclosure that includes: an aluminum base comprising a horizontal bottom having a base perimeter, vertical base sidewalls extending vertically from the base perimeter, and a base cavity defined by the bottom and inner surfaces of the vertical base sidewalls; a steel cover comprising a horizontal top portion and a cover perimeter having a cover edge, the cover engaging the base with the horizontal top portion extending horizontally over the base; and a friction stir weld between the cover edge and the sidewalls.

In another aspect the invention relates to a method of friction stir welding a steel piece to an aluminum piece with the steel piece and the aluminum piece being positioned to form a joint between an edge of the steel piece and an edge of the aluminum piece. The method includes contacting the joint with a rotating friction stir weld tool to form a friction stir weld.

In yet another embodiment, the invention relates to a method of friction stir welding a steel cover to an aluminum base. The aluminum base includes a horizontal bottom having a base perimeter, vertical base sidewalls extending vertically from the base perimeter, and a base cavity defined by the bottom and inner surfaces of the vertical base sidewalls. The steel cover includes a horizontal top portion and a cover perimeter having a cover edge, the cover engaging the base with the horizontal top portion extending horizontally over the base and to form a joint between the aluminum base and the cover edge. The method includes contacting the joint with a rotating friction stir weld tool to form a friction stir weld.

All drawings are schematic and not to scale.

DETAILED DESCRIPTION

The invention relates to methods for welding a piece of steel to a piece of aluminum by a forging technique known as friction stir welding. In various exemplary embodiments, the invention relates to: methods of friction stir welding a steel cover of an electronic device to an aluminum base of the device; electronic devices that include a steel cover that is friction stir welded to an aluminum base; and to precursors of these devices such as assemblies in the form of electronic device enclosures that include an aluminum base and a steel cover that are in an assembled condition that includes a joint between the base and the cover at which a friction stir weld can be produced.

According to the presently-described invention, generally, the Applicant has now determined that it is possible to weld an aluminum piece and a steel piece together by friction stir welding. According to the methods, the aluminum piece and the steel piece are held in contact with each other to form a joint, and a rotating friction stir weld tool is contacted with the joint, with pressure applied by the tool to the joint. The rotating tool and the pressure generate heat at the joint to soften both materials without melting either material. The heat and the rotating tool also cause flow and mixing of the two softened metal materials at the joint. Specifically, the rotating tool heats and mechanically mixes and joins the softened metal materials, at the joint, using the rotating tool and mechanical pressure to soften portions of the metal materials without melting the materials. The mixed materials are subsequently cooled to form the finished friction stir weld.

As follows, the invention is described in large part in terms of example uses of the inventive friction stir welding methods to form a friction stir weld between a steel cover and an aluminum base of different types of enclosures of electronic devices, specifically a hard disk drive. While the invention is effective for use with these types of assemblies of a steel piece and an aluminum piece, the inventive methods will also be understood to be useful with other combinations of a steel piece and an aluminum piece, which can be assembled and friction stir welded to produce a welded combination of the pieces that is useful for a different product or purpose, i.e., for preparing a welded combination of a steel piece and an aluminum piece that is not a hard disk drive or is not an electronic device.

According to one example embodiment ("Embodiment 1") of the invention wherein the steel piece is a cover of an enclosure of an electronic device, the steel piece can be a steel cover (or "cover," sometimes herein, for short) that includes (or consists of) a horizontal (flat, planar) top portion having a cover perimeter and an edge extending about the entire perimeter. The top portion may be flat, i.e., planar, and may meet the cover edge at the flat region of the cover perimeter. This type of cover may be placed over a base to contact sidewalls of the base at top surfaces of the sidewalls. According to this embodiment, the single flat steel cover is friction stir welded to a base, and the hard disk drive devices includes only the single steel cover that is friction stir welded to the base to cover the base cavity. Specifically, the hard disk drive is of a type that includes an aluminum base and just one cover, which is an outer steel cover friction stir welded to the top surfaces of the base sidewalls, and does not require or include an additional (second) cover. These types of hard disk drives do not require a low density (e.g., concentrated helium) atmosphere at the interior of the device. A friction stir weld that is used to secure the steel cover to the aluminum base is not required to provide a hermetic seal, but can provide a seal that is highly water tight and humidity-tight. The electronic device can be a hard disk drive that contains multiple hard magnetic recording disks in a stack, with appurtenant read-write heads and electronics to allow digital data to be recorded onto and retrieved from the hard magnetic disks. In particular embodiments the device may include an assembly of hard magnetic recording disks and read-write heads of a type capable of performing heat assisted magnetic recording ("HAMR"), i.e., the recording device may be of the type sometimes referred to as a heat assisted magnetic recording apparatus. These types of magnetic recording apparatus include a write head (or a read-write head) that includes an energy source that is configured to selectively heat a small portion of a heat-assisted magnetic recording medium (e.g., a hard magnetic disk) before that portion is magnetized by a write coil. The write coil is configured to apply a magnetic field to write data onto the heated portion of a heat-assisted magnetic recording medium. See, e.g., U.S. Pat. No. 9,019,646, the entirety of which is incorporated herein by reference.

According to other example enclosures ("Embodiment 2"), the cover may additionally include a vertical (meaning at least approximately or substantially vertical) lip that extends from the perimeter of the horizontal top portion in a vertical (downward) direction relative to the horizontal top portion. A lower portion of the lip (a "lower lip portion") includes a cover edge. When the cover and the base are assembled with the cover placed over the base, the lower lip portion engages an outer surface of the sidewall of the base and the cover edge engages the outer sidewall surface to form a joint between the cover edge and an outer surface of the aluminum base sidewall. The joint extends around the perimeter of the enclosure and is the location at which the friction stir weld can be formed. These types of hard disk drives include the aluminum base, an inner "process" cover placed over the base cavity between the outer cover and the base cavity, and the outer cover positioned over the base and the inner "process" cover to cover and enclose the inner "process" cover. The outer cover, according to the present invention, is made of steel and is welded to the base by a friction stir weld. The inner process cover is typically also made of steel and is held to the aluminum base by screws with a gasket located at a perimeter of the inner cover (between the inner cover and the base sidewall) to form a seal at an engagement between a surface at the perimeter of the inner process cover and a surface of the base sidewall. These types of hard disk drives include a low density (e.g., concentrated helium) atmosphere. The friction stir weld that is used to secure the outer steel cover to the base is sufficient to provide a hermetic seal. The hard disk drive may contain multiple hard magnetic recording disks in a rotatable stack, in a system that includes appurtenant read-write heads and electronics (e.g., controls) to allow digital data to be recorded onto and retrieved from the hard magnetic disks. The hard magnetic recording disks and appurtenant read-write heads and electronics (e.g., controls) may optionally be of a type that allows for heat assisted magnetic recording of digital information onto the hard magnetic recording disks.

Generally, and according to Embodiment 1 and Embodiment 2, example steel covers can be placed over an aluminum base with an edge of the steel cover contacting a surface of the sidewall of the aluminum base to form a joint between the base sidewall and the perimeter of the steel cover. Along the length of the joint, a friction stir weld can be produced to weld the steel cover to the aluminum base at the perimeter of the completed assembly.

As contemplated by the Applicant, the assembly may be in an assembled and pre-welded form, or in a posted-welded form. Specifically, an assembly may include the aluminum base and the steel cover assembled as an enclosure that includes a joint at a perimeter of the enclosure, wherein the aluminum base and the steel cover are held together (removably) at the joint in the absence of (i.e., prior to forming) a friction stir weld, e.g., by contact and friction or by use of a tool or jig. In a more completed form, the assembly may be a welded or "post-welded" assembly of the aluminum base and steel cover after a friction stir weld has been produced at the joint.

Example assemblies of the type referred to herein as Embodiment 1 can be a water- and moisture tight enclosure of an electronic device, e.g., a moisture-sealed hard disk drive, or a precursor thereof. The enclosure includes the aluminum base and a single steel cover that extends over the base to enclose the base cavity, with the steel cover being friction stir welded to the base at an upper horizontal surface of the base sidewall. The enclosure does not include a gasket between the steel cover and the base sidewall.

Desirably as a feature of a useful or preferred enclosure or electronic device of Embodiment 1, the friction stir weld functions as a water-tight and humidity-tight seal that substantially prevents the passage of liquid water or water vapor (humidity) into the base cavity of the enclosure. Example enclosures that include a friction stir weld as described, between an aluminum base and an steel cover, can exhibit resistance to moisture passing through the friction stir weld that is improved relative to a comparable seal between a steel cover and an aluminum base that includes the steel cover held to the aluminum base using screws, with a gasket seal between the cover and the base.

In the exemplary Embodiment 1 enclosures, the aluminum base includes an interior space or cavity defined by a horizontal (flat, planar) bottom that includes a perimeter, and by vertically-extending sidewalls that extend from the base, around the entire perimeter of the base, in a vertical direction relative to the horizontal bottom. Located over the base cavity is the steel cover, which extends over the base cavity with edges of the steel cover being located adjacent to or contacting the top surface of the sidewall of the base, so that the steel cover encloses the base cavity. The edge of the steel cover can contact the top surface of the sidewall to form a joint between the cover edge and a surface or surfaces of the top surface of the sidewall. A friction stir weld as described herein can be formed at the joint. The steel cover and the base can be the only pieces of the enclosure, and no additional cover is present or required; e.g., no additional "outer" cover is placed over the described steel cover.

The base may be constructed of any useful aluminum material and may have any general or specific form consistent with the present description. Example base structures may be made of aluminum alloy, for example a 4000 series or 6000 series aluminum alloy. The base structure can be of any useful form, such as being composed of a single integral piece or two or more pieces that are secured (e.g., welded) together. The process for preparing the base may be any, as desired, such as by being forged, extruded, cast, machined, stamped, etc.

The base sidewall extends continuously about the entire perimeter of the base and includes a vertically-extending outer sidewall surface and a top sidewall surface that extends horizontally at the top of the sidewall. With the cover and the base in an assembled condition, the edge of the cover that extends about the perimeter of the cover, i.e., the "cover edge," engages or contacts top sidewall surface. At that engagement, the cover edge forms a joint with the top sidewall surface; the joint extends continuously around the assembly at the perimeter of the assembly. As described herein, a friction-stir weld can be formed at the joint, around the entire perimeter of the assembly, to produce a friction stir weld that extends entirely around the perimeter of the base and the cover.

The sidewall has a thickness that extends horizontally from an outer sidewall surface to an inner sidewall surface that defines the base cavity. The thickness of the sidewall can vary along the height of the sidewall, such as by being thicker (having a greater thickness) at a lower portion of the sidewall, and being less thick (having a smaller thickness) at an upper portion of the sidewall. The sidewall top is the uppermost surface of the sidewall, which may typically include a horizontal orientation and have a thickness in a horizontal direction. A thickness at the top and bottom of the sidewall can preferably be at least about 1 millimeter, e.g., at least 2 millimeters. An example of a thickness of the sidewall at a lower (e.g., bottom) location of the sidewall can be at least 2 millimeters, e.g., in a range from 3 or 4 up to about 5, 7, or 8 millimeters (measured, for example, just above the bottom of the base cavity, where the sidewall meets the bottom of the base cavity).

The cover is constructed of steel, which includes a variety of alloys made substantially of iron, with a small percentage of carbon, e.g., at least 80, 85, 90, or 95 percent by weight iron and less than 2, 1.5, 1, 0.6, or 0.5 weight percent carbon. Other constituents (elements) are often present in minor amounts, such as molybdenum, manganese, silicon, phosphorus, sulfur, chromium, or nickel, in amounts of up to about 10, 5, or 2 percent by weight (total).

A thickness of a cover of an Embodiment 1 assembly as described, i.e., a thickness in a z-dimension (in a "height," or "vertical" direction) of the cover when the cover is positioned over the base, may be within a useful range that is sufficiently thick to allow for desired friction stir welding of the steel cover to the aluminum base, without being unnecessarily thick. A preferred cover may be relatively thin, because a thinner cover can allow for a larger interior space within an enclosure formed from the cover and the base, meaning a larger space for interior items such as magnetic recording disks. However, a thinner cover may be more difficult to process by friction stir welding compared to a relatively thicker cover, because relatively thinner materials are more prone to buckling and tearing. Thus, Applicant has determined that a thickness of a steel cover can be sufficiently great to allow for friction stir welding of the steel cover to the aluminum base as described herein, but held to a low or minimum thickness to allow for a greater amount of interior space of an enclosure that includes the steel cover. A thickness of an Embodiment 1 steel cover may be in a range from 10 mils to 50 mils, e.g., from 10 mils to 40 mils. Preferably, the entire cover, meaning the entire flat portion, has a thickness that is relatively uniform and in a range from 10 mils thick to 50 mils, e.g., from 10 mils to 40 mils thick.

Figure 1A:
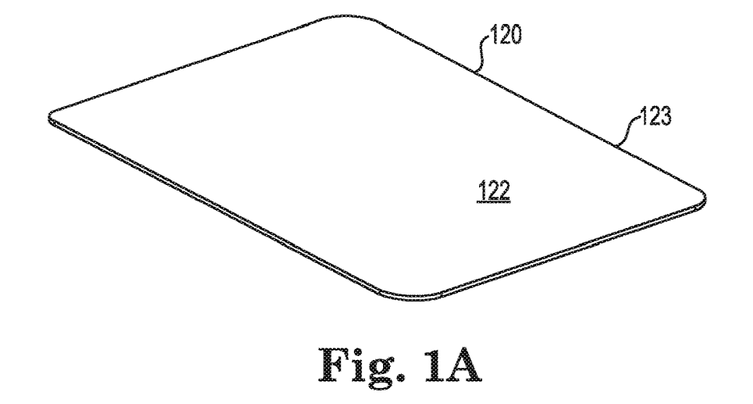
FIG. 1A shows a top perspective view of an example steel cover as described.
Figure 1B:
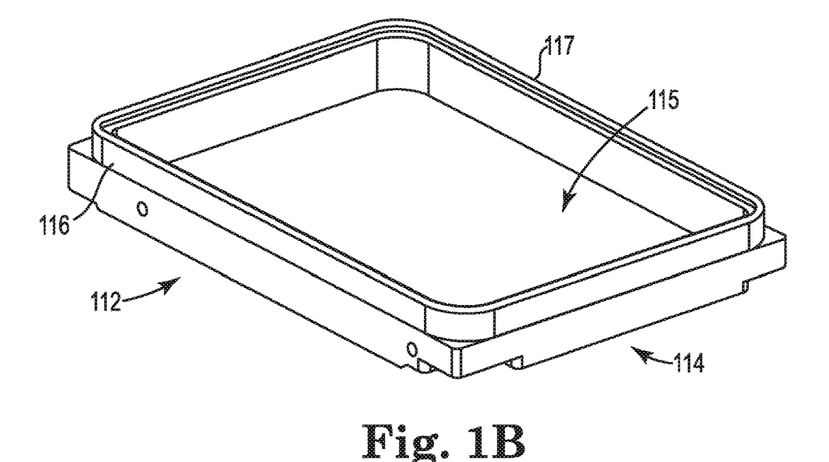
FIG. 1B shows a top perspective of an example aluminum base as described.
Figure 1C:
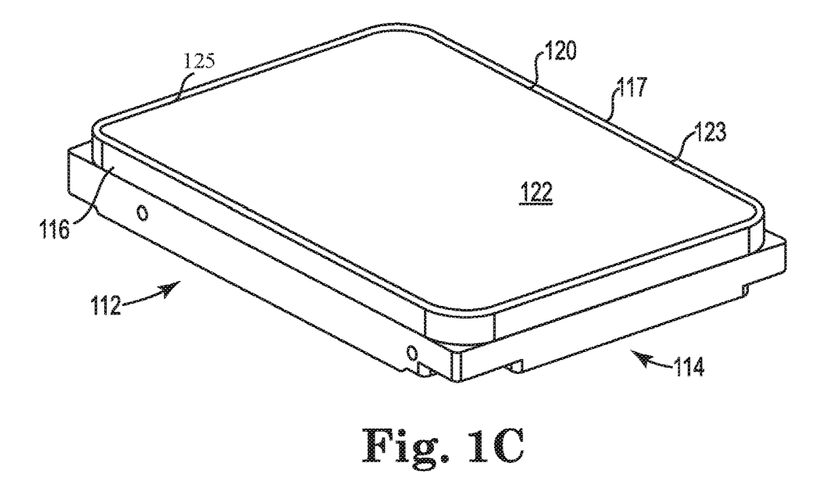
FIG. 1C shows a top perspective view of an example enclosure that includes a steel cover and an aluminum base.

Various figures provided herein show examples of covers 120, bases 112, and assemblies 90. FIGS. 1A, 1B, and 1C show an example of an Embodiment 1 enclosure. Referring to FIG. 1A, example cover 120, made of steel, includes horizontally-extending, flat top portion 122 having a perimeter that defines edge 123 extending about the entire perimeter of cover 120. FIG. 1B shows example base 112, which includes a horizontally-extending bottom 114 having a perimeter from which sidewalls 116 extend in an upward (vertical) direction (i.e., at least substantially or approximately vertical with reference to horizontally-extending bottom 114). Top surfaces 117 of sidewalls 116 are located at the top of sidewalls 116 around the entire perimeter of base 112. Base cavity 115 is defined by bottom 114 and sidewalls 116. Within base cavity 115 can be located multiple stacked magnetic recording disks (not shown) as well as appurtenant electronics, read-write heads, etc., of an operational hard disk drive.

When cover 120 is assembled to cover base 112, i.e., to enclose base cavity 115 and its contents, edges 123 contact top surface 117 of sidewalls 116 about the entire perimeter of base 112 and cover 120, for example at a joint formed between edge 123 and a surface or surfaces of top surface 117. See FIG. 1C. The joint can serves as a location at which a friction stir weld can be formed according to a method as described herein. FIG. 1C illustrates the assembly 90, including base 112, cover 120 positioned over base 112 in a manner that encloses base cavity 115, and with friction stir weld 125 formed between steel cover 120 and aluminum base 112, at the perimeter of assembly 90.

An example assembly referred to herein as Embodiment 2 can be a hermetically-sealed enclosure of an electronic device, e.g., a hermetically-sealed hard disk drive, or a precursor thereof. The enclosure includes an aluminum base as described herein, an inner ("process") cover, and an outer cover that is made of steel and that extends over the base to enclose the process cover, which encloses the base cavity. The outer cover is friction stir welded to the base at a sidewall of the base and over the perimeter of the enclosure.

Desirably as a feature of an electronic device of Embodiment 2, an interior of the base cavity includes a low density atmosphere. During preparation of the assembly, the interior of the base cavity is filled with an atmosphere of low density gas to displace air within the interior and to provide a low density (relative to air) atmosphere at the interior of the enclosure. An atmosphere of concentrated helium (e.g., at least 80, 90, 95, or at least 99 percent helium), for example, is one useful type of low density atmosphere. During preparation, the process cover is placed over the base cavity to enclose the base cavity, with a gasket seal between the base and the process cover. The enclosed base cavity is then evacuated and is filled with concentrated helium. The outer cover is placed over the base and the process cover, with the outer cover engaging the sidewall of the base at a joint that extends about the entire perimeter of the assembly. A friction stir weld is formed along the joint formed between the steel outer cover and the aluminum base, meaning around the entire perimeter of the assembly. The friction stir weld can be effective to hermetically seal the enclosure and contain the low density gas inside of the enclosure while preventing other gases at an exterior of the enclosure from entering the enclosure. Example hermetically sealed enclosures that include the friction stir weld can allow for not more than a very low rate of leakage from the enclosure, for example a rate of leakage that is less than 1 percent of a volume of atmosphere (gas) present within the enclosure per year. Examples of hard disk drives that include a base and a cover, and that are hermetically sealed to contain a low density atmosphere, are described in U.S. Pat. No. 9,536,572, the entirety of which is incorporated herein by reference. See also U.S. Pat. No. 8,279,552, describing a hermetically sealed hard disk.

The aluminum base of Embodiment 2 may be constructed of a useful aluminum alloy as described with respect to the aluminum base of Embodiment 1. The aluminum base includes the base cavity defined by a horizontal (flat, planar) bottom that includes a perimeter, and by the vertically-extending sidewalls that extend from the base. Located over the base cavity, yet still within the enclosure, is the "process" cover, along with an inner cover gasket, to provide an interior closure of the base cavity and to seal the base cavity. The inner cover can extend over the base cavity and contact the top surface of the sidewall of the base, at the top sidewall perimeter of the base, to cover and enclose the base cavity.

The base sidewall of an Embodiment 2 enclosure extends continuously about the entire perimeter of the base and includes a vertically-extending upper sidewall surface ("upper sidewall"), a vertically-extending lower sidewall surface ("lower sidewall"), a sidewall top, and a horizontally-extending shoulder surface ("horizontal shoulder surface") that extends horizontally as part of the sidewall at a location that is vertically between the top and the bottom of the sidewall along the height of the sidewall. The horizontal shoulder surface extends horizontally as part of the outer sidewall surface, and extends continuously around the entire perimeter of the base. The horizontal shoulder surface connects at an inner edge to a lower portion (or lower edge) of the upper sidewall, at an interior shoulder corner; the horizontal shoulder surface connects at an outer edge to an upper portion (or upper edge) of the lower sidewall, at an exterior shoulder corner.

With the cover and the base in an assembled condition, the lower portion (or "lower end") of the lip of the cover is seated against, e.g., engages or contacts, the lower portion of the upper sidewall, the horizontal shoulder surface, or both. At that engagement, the lower end of the lip forms a joint with the shoulder of the base; the engagement (or "joint") extends continuously around the assembly at the perimeter of the assembly. As described herein, a friction-stir weld can be formed at the joint, around the entire perimeter of the assembly, to produce a hermetic seal that extends entirely around the perimeter of the base and the cover.

The sidewall has a thickness that extends horizontally from an outer sidewall surface to an inner sidewall surface that defines the base cavity. The thickness of the sidewall can vary along the height of the sidewall, such as by being thicker (having a greater thickness) at a lower portion of the sidewall, and being less thick (having a smaller thickness) at an upper portion of the sidewall. The sidewall top is the uppermost surface of the sidewall, which may typically include a horizontal orientation and have a thickness in a horizontal direction. A thickness at the top and bottom of the sidewall can preferably be at least about 1 millimeter, e.g., at least 2 millimeters. A presently-useful example of a sidewall can have a thickness at a location of formation of a friction stir weld that may be equal to or greater than a thickness at the top of the sidewall, i.e., a greater thickness at a location of the joint, which is the location at which a friction stir weld will be formed. An example of a thickness of the sidewall at a location of a friction stir weld can be at least 1 millimeter, e.g., in a range from 2 or 3 to 5 or 7 millimeters (measured, for example, just above the horizontally-extending shoulder surface). An example of a thickness of the sidewall at a lower (e.g., bottom) location of the sidewall can be at least 2 millimeters, e.g., in a range from 3 or 4 up to about 5, 7, or 8 millimeters (measured, for example, just above the bottom of the base cavity, where the sidewall meets the bottom of the base cavity).

The steel cover of Embodiment 2 may be constructed of a useful steel material as described with respect to the steel cover of Embodiment 1. A thickness of a cover for an Embodiment 2 enclosure can be sufficiently great to allow for friction stir welding of the steel cover to the aluminum base, as described herein, but held to a low or minimum thickness to allow for a greater amount of interior space of an enclosure that includes the cover. A range of thicknesses that can be useful or preferred is in a range from 10 mils to 50 mils, e.g., from 10 mils to 40 mils. Preferably, the entire cover, including the vertically-extending lip along the perimeter of the cover, as well as the flat upper portion, has a thickness that is relatively uniform and in a range from 10 mils thick to 40 mils thick. In preferred examples of assemblies as described, a thickness of a horizontal shoulder surface that engages a lip end portion of the cover, at a joint, can also be within this range and can be approximately equal to the thickness of the lip at the lip end portion.

Figure 2A:
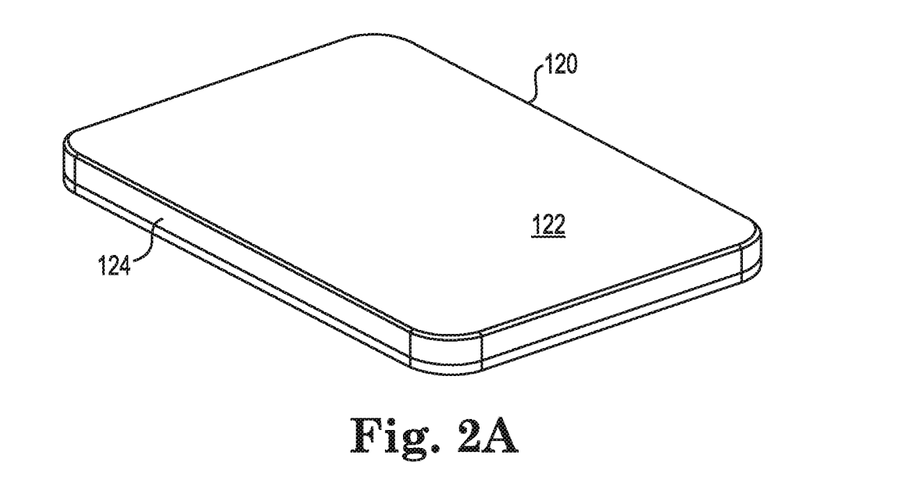
FIG. 2A shows a top perspective view of an example steel cover as described.
Figure 2B:
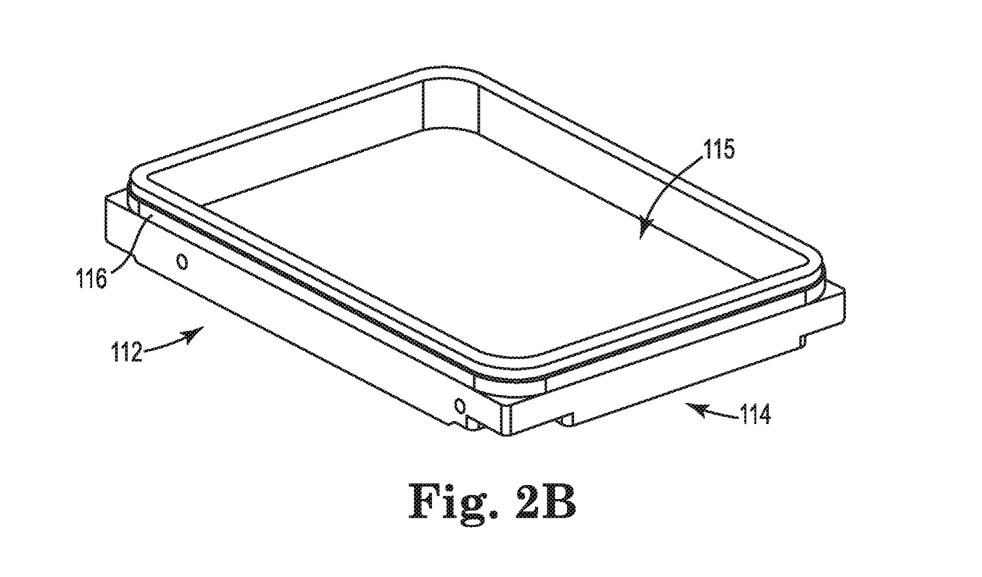
FIG. 2B shows a top perspective of an example aluminum base as described.

FIGS. 2A, 2B, 2C, and 2D, illustrate an example of an Embodiment 2 enclosure. Referring to FIG. 2A, example steel cover 120 includes horizontally-extending top portion 122 having a perimeter from which cover lip 124 extends in a downward vertical direction (i.e., at least substantially or approximately vertical with reference to horizontally extending top portion 122). FIG. 2B shows example aluminum base 112, which includes a horizontally-extending bottom 114 having a perimeter from which sidewalls 116 extend in an upward (vertical) direction (i.e., at least substantially or approximately vertical with reference to horizontally-extending bottom 114). Base cavity 115 is defined by bottom 114 and sidewalls 116. Within base cavity 115 can be located multiple stacked magnetic recording disks (not shown) as well as appurtenant electronics, read-write heads, etc., of an operational hard disk drive.

Figure 2C:
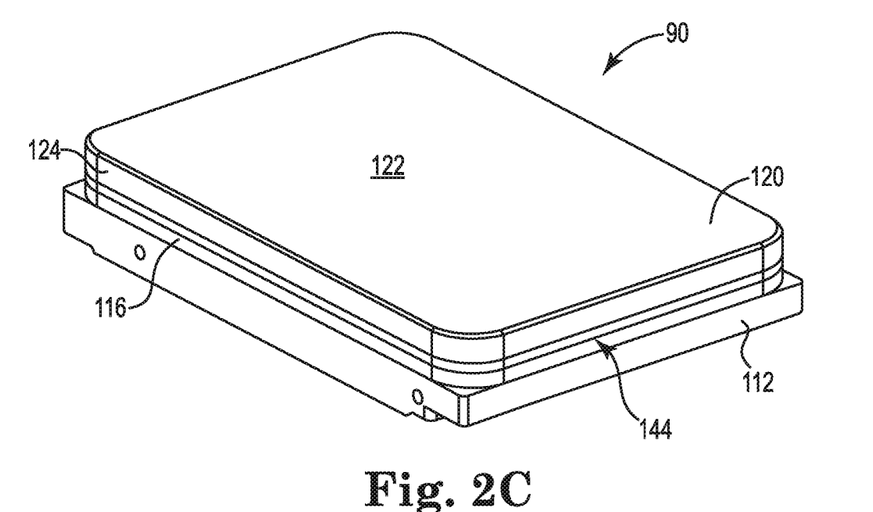
FIG. 2C shows a top perspective view of an example enclosure that includes a steel cover and an aluminum base.
Figure 2D:
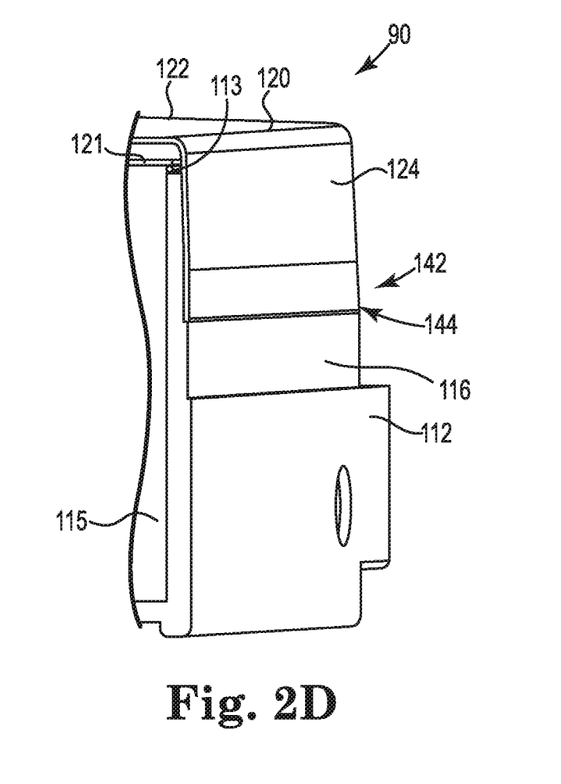
FIG. 2D shows a cut-away side view of an example enclosure that includes a steel cover and an aluminum base.

Referring to FIGS. 2C and 2D, assembly 90 is made by placing steel cover 120 over aluminum base 112 to form joint 144 around a perimeter of assembly 90, at which a friction stir weld can be formed. FIG. 2D shows a cut-away view of joint 144 with cover lip 124 contacting shoulder 142 of base 112 to form joint 144. Also shown in FIG. 2D are process cover 121 and process cover gasket 113.

A joint (e.g., 144) between a sidewall of an aluminum base, and a cover edge of a steel cover (e.g., of Embodiment 1 or Embodiment 2), can be processed by a step of friction stir welding the joint to produce a friction stir weld (not shown at FIG. 2D but optionally present along joint 144) along the length of the joint, e.g., around the entire perimeter of the cover at the joint.

Friction stir welding of an aluminum base and a steel cover at a joint formed between the two can be performed by rotating a friction stir weld tool and contacting the rotating tool to the joint, with pressure. The rotating tool generates heat at the joint to soften and cause flow of the two different metal material of the aluminum base and the steel cover, at the location of the joint. Specifically, the rotating tool heats and mechanically mixes and joins the two different metal materials of the base and the cover edge, at the joint, using mechanical pressure to soften portions of the metal materials of the cover edge and of the base in contact with and adjacent to the tool, and blends the portions of softened metal materials. The softened and mixed metal materials subsequently cool to form the finished friction stir weld. In preferred examples, a depth of the friction stir weld is at least as deep as the thickness of the cover at the cover edge, preferably at least 5 or 10 percent greater than the thickness of the lip end.

Figure 3:
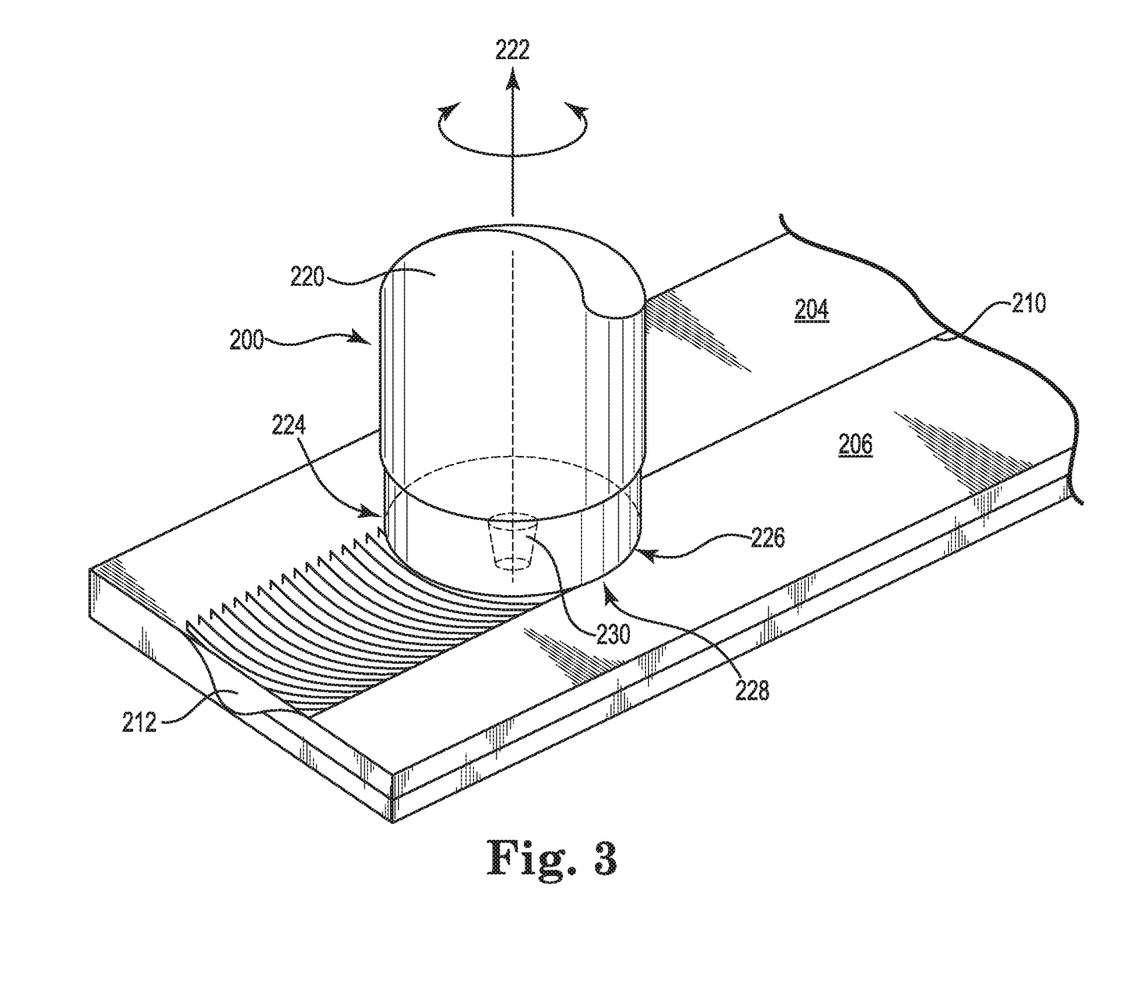
FIG. 3 shows an example friction stir weld step as described.

Referring now to FIG. 3, a method of friction stir welding a joint as described, e.g., as part of an Embodiment 1 enclosure or an Embodiment 2 enclosure, can be performed by providing tool 200 for forming a friction stir weld and rotating the tool, while applying pressure at joint 210, to form a friction stir weld 212. A first metal component 204, e.g., an aluminum base, and a second metal component 206, e.g., a steel cover, meet at adjacent edges to form joint 210, e.g., as described herein. Tool 200 includes support body 220 having longitudinal axis 222 and distal end 224. Distal end 224 includes distal face 228 (held against a top surface of joint 210) adapted to contact surfaces of metal pieces 204 and 206 at joint 210 during friction stir welding. Distal face 228 is centered on axis 222 and extends laterally to a perimeter of support body 220 centered on axis 222. Extending in a distal direction from distal face 228, along axis 222, is pin 230, which extends into first and second metal pieces 204 and 206 at joint 210 during friction stir welding.

During formation of a friction stir weld (212) along a length of a joint 210, distal face 228 of tool 200 is placed in contact with surfaces of metal pieces 204 and 206 at joint 210. Pressure from tool 200 is applied to joint 210 as tool 200 is rotated to soften (without melting) the steel of cover 206 and the aluminum of base 204. As tool 200 moves along joint 210, friction stir weld 212 is formed. The tool (i.e., along axis 222) may be held at an angle relative to surfaces of pieces 204 and 206, and not precisely perpendicular to the surfaces. The angle may produce a tilt in a direction that aligns with the direction of motion of the tool, with the upper portion of the tool being tilted backward and the distal face being tilted to face a direction of forward movement of tool 200. The size of the angle may be relatively small, e.g., not more than 10 degrees from perpendicular.

Parameters of a useful step of forming a friction stir weld can be any that are useful to produce a desired friction stir weld. Examples of parameters that can be selected and controlled include rotation speed of the tool, downforce of the tool against the workpiece, speed of the tool along the length of the joint (i.e., speed of forming the weld in a length-wise direction, also referred to as translational speed), an angle of the tool relative to the workpiece (e.g., from 1 to 10 degrees), as well as the shape of the tool and the dimensions of the tool such as the diameter of the tool at the distal face and the diameter and the length of the pin (pin length being measured along the axis of the tool from the distal face).

A depth of a friction stir weld will typically be slightly greater than a length of a pin extending from the distal face of a tool used to form the weld. A desired depth of a weld as described herein is at least as deep as, preferably deeper than, the thickness of the steel cover at the cover edge that forms the joint. To form a weld of this depth, the length of the pin should be at least as long as the thickness of the lip (at the joint) and at least as long as the width of the horizontal shoulder surface of the joint, e.g., at least 5, 10, 20, or 30 percent greater than one or both of those dimensions.

During formation of the weld, the tool can be rotated at a speed that is useful to add sufficient energy to the two metal components of a joint to soften both the aluminum and the steel piece and allow mixing of the components by the tool. Useful and preferred rotational speeds of a tool to form a friction stir weld as described can be at least 1,000 revolutions per minute (rpm), e.g., at least 8,000 rpm, or at least 10,000, or 12,000 rpm, and up to about 25,000 or 30,000 rpm.

During formation of the weld, the tool, i.e., at the distal face, can apply a downforce to the two metal components at the joint in a direction along the axis of the tool. Any amount of downforce can be used that will be effective in forming a desired weld in an efficient manner. Examples of a useful downforce may be less than about 800 pounds (force) e.g., less than 500 pounds (force) or less than 300 or 200 pounds (force).

During formation of the weld a tool may be moved along a joint in a lengthwise direction at any useful speed, preferably a speed that will efficiently form a high quality weld. Examples of useful speeds (translational speed) of a tool along a joint during formation of a friction stir weld can be in a range from about 40 to 400 millimeters per second (mm/s), e.g., from 50 to 250 mm/s or from 70 to 150 mm/s.

In combination, useful tool rotation speed, downforce, and translational speed can be, e.g., from 15,000 to 20,000 rpm, from 110 to 160 pounds (force), and from 50 to 150 mm/s, respectively.

Figure 4:
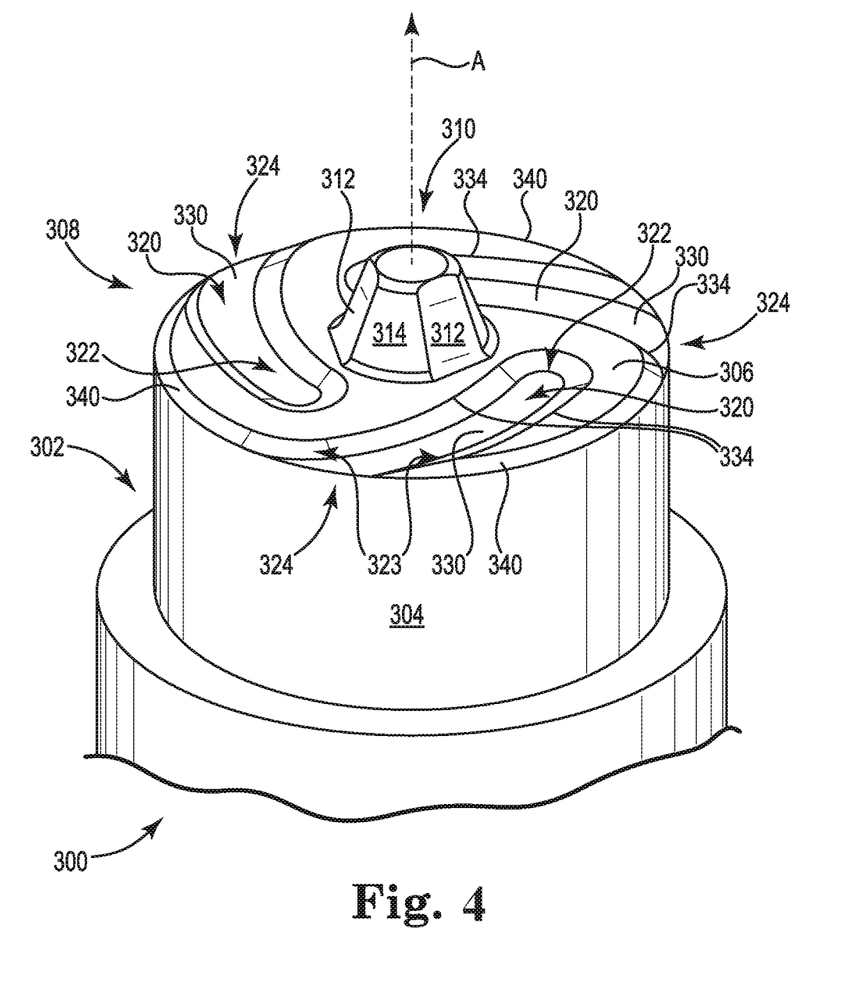
FIG. 4 shows an example of a friction stir weld tool.

An example of a useful tool is shown at FIG. 4. As illustrated, tool 300 includes support body 302 that has a longitudinal axis (A), outer surface 304 centered on the axis, and distal face 306 centered on the axis and extending from the axis laterally to perimeter 308 of distal face 306 and support body 302. Pin 310 extends from distal face 306 in a direction along the axis and distally from distal face 306.

Distal face 306, exemplary as illustrated, includes a scroll pattern that includes at least two arcuate (when viewed in a direction of axis A) grooves 320 formed in distal face 306. Each groove 320 extends from a groove start location 322 located between the axis and perimeter 308, to a groove end segment 324 at perimeter 308. A depth of each groove in distal face 306 may be shaped as desired, with useful or preferred grooves having a maximum depth in a range from 0.05 to 0.5 millimeters relative to the surface of distal face 306. Preferred grooves can have a shape (when viewed in cross section in a plane that includes the axis) that includes a bottom 330 (at a maximum depth of the groove) and sidewalls 323 that extend from bottom 330 to opposed distal (e.g., upper) edges 334 of each groove 320, where each groove 320 meets distal face 306 at a cornered edge. The shape of preferred grooves can include sidewalls 322 that are curved or angled (e.g., chamfered) relative to the direction of axis A, i.e., not parallel to axis A. In cross section, a useful or preferred sidewall can have a surface that is considered to extend along a line that is non-parallel to the axis, for example along a line that forms an angle with the axis that is in a range from 30 to 60 degrees. Curved or chamfered sidewalls 332 differ from sidewalls that are vertical, meaning sidewalls that extend in a direction that is parallel to axis A.

As illustrated, tool 300 includes three chamfered shoulder segments 340 that extend along perimeter 308 between three groove end segments 324. Each chamfered shoulder segment 340 extends along perimeter 308 between two adjacent groove end segments 324. Each chamfered shoulder segment 340 includes a surface that connects and extends between distal face 306 and a distal end of outer surface 304 of support body 302, with each surface extending in a direction that includes a directional component that is the parallel with the axis. In cross section in a plane of the axis, each chamfered shoulder segment surface can be considered to extend along a line that is non-parallel to the axis, for example along a line that forms an angle with the axis that is in a range from 30 to 60 degrees.

Pin 310 can have any structure, shape, or form that will provide desired performance of tool 300 when used for friction stir welding. Useful and preferred examples of shapes of pin 310 can include multiple outer surfaces (e.g., sidewalls) that include three or more facets 312, which are flat or planar surfaces that can preferably be oriented to be non-parallel to axis A. Facets 312 may be connected to adjacent facets or may optionally be interrupted by rounded portions 314. The number of facets on a pin can be as desired and useful, e.g., at least 3, and up to 5, 6, 8, or more. Distal pin end (the portion of pin 310 that is farthest away from distal face 306) of pin 310 can be flat and planar, i.e., perpendicular relative to axis A or may be cornered, angular, or substantially sharp, e.g., if formed by an intersection of facets 312.

Specific dimensions of a tool as described can be any that are useful for forming a friction stir weld. Useful sizes of a support body (e.g., diameter at a distal face), grooves, and a pin of a tool can be comparable to tools that have previously been useful for forming friction stir welds. According to certain embodiments of tools of the present description, however, a tool may have relatively smaller features sizes, which may allow a tool to be useful to form friction stir welds with potentially advantageous operating parameters, for example by use of a relatively higher tool rotational speed (rpm), relatively higher translational speed, a reduced downforce, or two or more of these.

In additional detail, useful dimensions of a support body and pin may be ones that are capable of being used to form a desired friction stir weld, with dimensions of any particular tool being selected based on factors that include the type and dimensions (e.g., thickness) of a workpiece, the desired size dimensions (width and depth) of a friction stir weld that is being formed, and desired or preferred operating parameters such as rotational speed (rpm), translational speed, and downforce. For a tool that is capable of preferred uses that include forming a friction stir weld between a relatively thin steel cover and a thicker aluminum base, with the use of one or more of a relatively high rotational speed (rpm) or relatively high translational speed, certain relatively smaller dimensions can be preferred, such as a relatively small diameter of the support body, a relatively short length of a pin, and a relatively small diameter of the pin. According to such embodiments, a diameter of a support body at or near a shoulder may be less than about 7 millimeters, e.g., in a range from 1 to 5 millimeters, such as from 2 to 4 millimeters. Also according to these embodiments, a length of the pin may be a length that is sufficient to form a weld of a desired depth; when working with a relatively thin workpiece, a length of an example pin may be in a range from 0.2 to 1.2 millimeters, e.g., from 0.3 to 0.8 millimeters. A diameter of the pin for such embodiments, measured at a base of the pin located at a connection of the pin to the distal face, may be in a range from 0.2 to 0.9 millimeter, e.g., from 0.3 to 0.7 millimeter.

The invention claimed is:

1. An enclosure comprising:
   an aluminum base comprising a horizontal bottom having a base perimeter, vertical base sidewalls extending vertically from the base perimeter, and a base cavity defined by the bottom and inner surfaces of the vertical base sidewalls,
   a steel cover comprising a horizontal top portion and a cover perimeter having a cover edge, the cover engaging the base with the horizontal top portion extending horizontally over the base, and
   a friction stir weld at a joint between the cover edge and the sidewalls, wherein
   the sidewalls comprise outer sidewall surfaces extending along an outer perimeter of the sidewalls,
   the cover comprises the horizontal top portion and a lip extending vertically at the cover perimeter, the lip comprising a lower lip portion that includes the cover edge at which the friction stir weld is formed, the steel cover has a thickness at the joint, the aluminum base has a thickness at the joint, and the thickness of the aluminum base at the joint is greater than the thickness of the steel cover at the joint, and the steel cover has a thickness at the joint in a range from 10 to 50 mils.

2. An enclosure of claim 1 wherein:
outer sidewall surfaces comprise:
an upper sidewall surface extending vertically upward from the location of the friction stir weld, and
a lower sidewall surface extending vertically downward from the location of the friction stir weld; and
wherein
the lower lip portion comprises an inner surface that contacts the upper sidewall surface.

3. An enclosure of claim 1 wherein the friction stir weld extends around the entire base perimeter and the entire cover perimeter to form a hermetic seal between an interior of the enclosure and an exterior of the enclosure.

4. An enclosure of claim 1 comprising a helium interior atmosphere.

5. An enclosure of claim 1 wherein the enclosure is part of a hard disk drive.

6. An enclosure of claim 5 wherein the hard disk drive includes a heat assisted magnetic recording apparatus.

7. A method of friction stir welding a steel piece to an aluminum piece, the steel piece and the aluminum piece being positioned to form a joint between an edge of the steel piece and an edge of the aluminum piece, the method comprising contacting the joint with a rotating friction stir weld tool to form a friction stir weld, wherein the steel piece has a thickness at the joint, the aluminum piece has a thickness at the joint, the thickness of the aluminum piece at the joint is greater than the thickness of the steel piece at the joint, and the steel piece has a thickness at the joint in a range from 10 to 50 mils.

8. A method of friction stir welding a steel cover to an aluminum base,
an aluminum base comprising a horizontal bottom having a base perimeter, vertical base sidewalls extending vertically from the base perimeter, and a base cavity defined by the bottom and inner surfaces of the vertical base sidewalls,
a steel cover comprising a horizontal top portion and a cover perimeter having a cover edge, the cover engaging the base with the horizontal top portion extending horizontally over the base and to form a joint between the aluminum base and the cover edge, the method comprising contacting the joint with a rotating friction stir weld tool to form a friction stir weld,
wherein the steel piece has a thickness at the joint, the aluminum base has a thickness at the joint, the thickness of the aluminum base at the joint is greater than the thickness of the steel cover at the joint, and the steel cover has a thickness at the joint in a range from 10 to 50 mils.

9. A method of claim 8,
the aluminum base comprising:
a horizontal bottom and a base cavity defined by the bottom and vertical base sidewalls at the base perimeter,
an outer sidewall surface extending along the base perimeter that includes:
a shoulder comprising:
a horizontal shoulder surface,
an upper sidewall surface extending vertically upward from the horizontal shoulder surface, and
a lower sidewall surface extending vertically downward from the horizontal shoulder surface; and
the steel cover being located over the base, the steel cover including the horizontal top portion extending over the base and a lip at the cover perimeter, the lip extending in a vertical direction relative to the horizontal top portion, the lip including a lower lip portion comprising the cover edge engaged with the shoulder to form the joint when the cover is installed over the base;
the method comprising contacting the joint with a rotating friction stir weld tool to form the friction stir weld.

10. A method of claim 7 wherein the tool comprises:
a support body having a longitudinal axis and a distal end,
a distal face at the distal end, and
a pin extending from the distal face along the axis,
the method comprising placing the distal face in contact with the joint and rotating the tool about the axis while the distal face contacts the joint.

11. A method of claim 10 wherein:
the distal face perimeter has a diameter in a range from 1 to 5 millimeters,
the pin has a length along the axis in a range from 0.2 to 0.7 millimeters, or both.

12. A method of claim 7 comprising rotating the tool at a speed of at least 8,000 revolutions per minute.

13. A method of claim 7 comprising, during forming the friction stir weld, applying downforce in a direction of the axis from the tool to the workpiece, the downforce being less than 800 pounds (force).

14. A method of friction stir welding a steel piece to an aluminum piece, the steel piece and the aluminum piece being positioned to form a joint between an edge of the steel piece and an edge of the aluminum piece, the method comprising contacting the joint with a rotating friction stir weld tool to form a friction stir weld, wherein the tool comprises:
a support body having a longitudinal axis and a distal end,
a distal face at the distal end, and
a pin extending from the distal face along the axis, the pin having a length in a range from 0.2 to 0.7 millimeter and a diameter in a range from 0.2 to 0.9 millimeter, the method comprising placing the distal face in contact with the joint and rotating the tool about the axis while the distal face contacts the joint.

15. A method of claim 8 wherein the tool comprises:
a support body having a longitudinal axis and a distal end,
a distal face at the distal end, and
a pin extending from the distal face along the axis,
the method comprising placing the distal face in contact with the joint and rotating the tool about the axis while the distal face contacts the joint.

16. A method of claim 15 wherein:
the distal face perimeter has a diameter in a range from 1 to 5 millimeters,
the pin has a length along the axis in a range from 0.2 to 0.7 millimeters, or both.

17. A method of claim 15 comprising rotating the tool at a speed of at least 8,000 revolutions per minute.

18. A method of claim 15 comprising, during forming the friction stir weld, applying downforce in a direction of the axis from the tool to the workpiece, the downforce being less than 800 pounds (force).

19. A method of claim 15 wherein:
the distal face perimeter has a diameter in a range from 1 to 5 millimeters, the pin has a length along the axis in a range from 0.2 to 0.7 millimeters, and the pin has a diameter in a range from 0.2 to 0.9 millimeters.

20. A method of claim 7 wherein the steel piece is a cover having a cover perimeter and an edge extending about the entire perimeter.

21. A method of claim 14 wherein the steel piece is a cover having a cover perimeter and an edge extending about the entire perimeter.

* * * * *